United States Patent [19]

Rosenblatt

[11] 3,775,170

[45] Nov. 27, 1973

[54] PLASTIC DUPLICATE OF CELLULOSIC OR PROTEINACEOUS MATERIAL, ARTICLE OR OBJECT

[75] Inventor: Solomon Rosenblatt, Nutley, N.J.

[73] Assignee: Chemplast, Inc., East Newark, N.J.

[22] Filed: June 25, 1971

[21] Appl. No.: 157,001

Related U.S. Application Data

[60] Continuation of Ser. No. 870,994, Sept. 2, 1969, abandoned, which is a division of Ser. No. 433,631, Feb. 18, 1965, Pat. No. 3,497,256.

[52] U.S. Cl....117/138.8 VA, 117/46 CC, 117/138.8 UF, 117/141, 117/143 A, 117/161 UF, 128/113, 161/7, 161/46, 264/126, 264/127, 264/317

[51] Int. Cl. .................. B41m 5/24, B29c 13/00

[58] Field of Search ............... 264/49, 127, 44, 264/317, 126; 260/41 A, 2.1 R, 2.5 M; 117/161 UF, 138.8 UF, 46 CC; 161/46

[56] References Cited

UNITED STATES PATENTS

| 2,773,781 | 12/1956 | Rodman | 117/138.8 UF |
|---|---|---|---|
| 3,090,094 | 5/1963 | Schwartzwalder et al. | 264/44 X |
| 2,838,045 | 6/1958 | Ryznar | 117/161 UF |
| 2,568,883 | 2/1952 | Stroh | 260/2.1 E X |
| 3,056,686 | 10/1962 | Shannon | 260/2.1 R X |
| 2,977,265 | 3/1961 | Forsberg et al. | 161/50 X |
| 2,825,706 | 3/1958 | Sanders | 117/161 UF |
| 3,047,421 | 7/1962 | Taylor | 117/161 UF |

FOREIGN PATENTS OR APPLICATIONS 666,361   7/1963   Canada..................... 117/138.8 UF Primary Examiner—Ralph Husack
Attorney—Daniel H. Bobis

[57] ABSTRACT

A plastic, material, article or object formed as a substantial duplicate in high molecular weight polymeric material such as polyfluorocarbon resins, polyvinyl chloride and polyvinyidene chloride; of a matrix consisting of cellulosic and proteinacious materials by the process of impregnating a selected matrex with the selected high molecular weight polymeric material and carbonizing the matrix in a controlled concentration of oxygen at a temperature at least equal to the sintering temperature of the selected high molecular weight polymeric duplicating material until the duplicating material coalesces to form the self-supporting continuous duplicate by gradual replacement of the carbonizing fibers of the selected matrix.

7 Claims, 10 Drawing Figures

Fig. 1
TISSUE PAPER SAMPLE

Fig. 2
TISSUE PAPER SAMPLE IMPREGNATED

Fig. 3
SINTERED SAMPLE

Fig. 4
PLASTIC DUPLICATE

INVENTOR
SOLOMON ROSENBLATT

BY Daniel H. Bobis

ATTORNEY

SOLOMON ROSENBLATT
INVENTOR.

BY Daniel H. Bobis
Atty

FIG. 10

SOLOMON ROSENBLATT
*INVENTOR.*

PLASTIC DUPLICATE OF CELLULOSIC OR PROTEINACEOUS MATERIAL, ARTICLE OR OBJECT

This application is a continuation of co-pending application Ser. No. 870,994 filed Sept. 2, 1969 which last mentioned application was a division of application Ser. No. 433,631 filed Feb. 18, 1965. Application 870,994 will become abandoned after the effective filing date of the present application and application Ser. No. 433,631 has matured into U.S. Pat. No. 3,497,256 granted Feb. 24, 1970.

BACKGROUND OF THE INVENTION

Various methods of making plastic filaments, plastic sheets and plastic articles are known in the prior art. For example, it is known to form plastic paper by the deposition of plastic fibers, a technique which duplicates for the most part the procedures for making paper. Similarly techniques have been developed for weaving plastic filaments similar to the procedures used for making cloth.

It is also known that replicas of the gross appearance of objects, articles and materials made of certain expanded solids such as polyurethane; polystyrene and urea-formaldehyde foams and sponges can be effected by impregnations of such objects with slurries and then curing the impregnated object or article as is set forth in U.S. Pat. Nos. 3,111,396 and 2,805,208; and replicas of cellulose fibers has also been achieved by an encapsulating technique as described in U.S. Pat. No. 3,121,698.

However these last mentioned procedures cannot and do not reproduce in all the fine detail substantially the exact internal and external fiber geometry of objects, articles and sheets of material and therefore cannot duplicate in such replicas the properties and qualities of these reproduced objects, articles and sheets of material.

The present invention seeks to overcome the problems incident to applying our modern day materials to the old techniques for making paper, textiles, and other types of objects, articles and materials; and the problems of earlier efforts to reproduce copies of such objects, articles and materials; by providing a novel direct conversion duplication process for making in plastic, sheets, objects, articles and filaments from counterpart, sheets, objects, articles and filaments of less thermally stable or chemically stable matrices.

In the present invention the object, article, sheet of material or filament selected to be duplicated will have a given carbonization range and will provide the internal and external form or geometry of a matrix or model to be impregnated which fine particles of a duplicating substance, related to the matrix in that its sintering temperature is within the carbonization range of the matrix; the particles during impregnation being randomly deposited so that when the impregnated matrix is subject to temperatures at or above the point of carbonization in a controlled atmosphere, continuous and controlled carbonization and uniform sintering can be effected to cause the particles of the duplicating substance to orient and coalesce in and along the fibers of the fiber geometry of the matrix and thus provide a substantial duplicate of the internal and external fiber geometry of the original matrix in the duplicating substance which if necessary can be further treated to remove any residue of the original matrix.

The term matrix when used herein shall mean any filament, material, object or article which can be decomposed or eliminated by heat or elevated temperatures or by chemical processes and/ or other techniques which do not simultaneously affect and damage the duplicating substance and is capable of maintaining its geometry under the processing steps and conditions necessary to establish the duplicate counterpart.

In the present invention the duplicating substances referred to herein and illustrated as the material deposited and impregnated into and throughout the fiber structure of a matrix or model to be duplicated are plastics and when used herein plastic or plastics are intended to mean high molecular weight polymeric materials or compounds most of which are not known to exist in natural form such as polytetrafluoroethylene; polymonochlortrifluoroethylene, polyvinylchloride, polyvinylidenechloride, etc; and further while plastics are used in the examples set forth below it will be clear to those skilled in the art as is more clearly described below that any substance can be utilized which has the properties to act relative to the matrix according to the steps of the present process and further can be deposited in the concentration and particle sizes to effect the required infiltration and impregnation of the fibers of the matrix to be duplicated can be utilized to achieve the advantageous results of the present invention.

Accordingly it is an object of the present invention to make plastic sheets of material and plastic objects, filaments and articles by the direct conversion and duplication of a less chemically or thermally stable matrix.

It is another object of the present invention to reproduce a matrix preferably one that is porous in a material which is superior to the matrix without going through the fundamental processes by which the matrix was produced or fabricated.

It is an object of the present invention to make or form materials, objects, filaments and articles made of plastic and other materials having more superior qualities and fundamental advantages than similar articles of less superior material which serve a variety of similar or new uses such as chemically resistant filters for solutions and gases; sterilizable non-sticking medical dressings; heart and lung machine membranes and dialysis membranes for artificial kidneys; porous non-woven plastic fabrics; battery separators; porous textile fabrics; lint-free wipers; non-wettable plastic paper; and special products for insulation and for uses where the less superior materials tend to break down or fail to function.

With these and other objects in view the invention may be better understood by reference to the accompanying drawing on which.

Broadly the process of the present invention relies on an interrelation between the properties of the duplicating substance and the properties of the less chemically and thermally stable material of the matrix such that when the steps of the process hereinafter described are followed there is formed in the duplicating substance an identical duplicate structure of the matrix; duplication occurring as a function of the controlled elimination of the matrix.

Duplicating substances which meet these requirements are those which can be formed in the concentration and particle size to permit the duplicating substance to be infiltrated and impregnated throughout the internal and external fiber geometry of a matrix to be duplicated; sinter or coalesce and are stable at the carbonization temperature and conditions to which the matrix being duplicated is subjected; and have sufficient mobility at the carbonization temperature and under the controlled atmosphere to which the matrix is subjected to orient so as to replace and substitute for the actual structure of the fiber geometry of the matrix as the matrix is slowly decomposed and shrunk due to oxidation at the carbonization conditions to which it is subjected.

Conversely the matrix of the present process must be one which carbonizes within a temperature range which includes the critical sintering temperature of the duplicating substance; and when subjected to carbonization maintains the internal structure of the fibers for a sufficient length of time, as for example, in the formation of a carbonaceous skeleton of the fibers of the matrix to produce during carbonization sufficient local heat of combustion at the discrete fibers that the surface tension of the randomly deposited particles of the duplicating substance in, on, into and along these fibers is sufficiently lowered with respect to the particles between the fibers that all the particles gradually align, orient and coalesce preferentially in, on, into and along the fibers and thus form substantial duplicates of the entire fiber geometry of the matrix.

The preferred impregnating substances used for duplicating the matrix are colloidal dispersions of polyfluorocarbon resins, such as polytetrafluoroethylene, in combination with a suitable wetting agent for reasons which are set forth more fully below. However, the impregnating substances need not be limited to acqueous colloidal dispersions but may be any suitable vehicle which can carry the required concentration and particle size of the duplicating substance required in this process. Thus, an organic suspension of monochlorotrifluoroethylene will work equally as well as does latices, etc., and powdered or crystalline solids of a symbiotic duplicating substance may also be used where the technique for effecting infiltration and impregnating of the fiber geometry of the matrix can be varied as by vacuum deposition or sublimation techniques.

Acqueous colloidal dispersions of polyfluorocarbon resin in combination with wetting agents are preferred because they are available in the open market; the surface energy between the continuous phase of a colloidal dispersion the colloid in the dispersion and a fiber on which the colloid dispersion is deposited may be widely modified by the type and concentration of the wetting agent to take advantage of the processes of surface chemistry for optimum infiltration and impregnation of the fiber geometry of the matrix, and they provide the concentration and particle size for a given duplicating substance as will appear clear from the example of the process hereinafter illustrated to develop the internal and external surface detail of the fiber geometry of the preselected matrix. By the correct choice of wetting agent one may simultaneously enhance colloid stability and decrease the surface tension of the continuous phase of the colloidal dispersion so that the continuous phase of the colloidal dispersion will infiltrate and impregnate the fiber geometry of the matrix carrying with it and thus spreading the particles of colloid evenly on, into and throughout the internal and external surfaces and interstital spaces of the fiber geometry of the matrix with a minimum of bridging between interlaced and unconnected discrete fibers.

In the present invention particle size must be correlated with the mobility of the duplicating substance selected. Mobility being that property at the carbonization and sintering conditions which causes the particles of the duplicating substance to spread in the area of the fiber on which it is deposited beyond the initial peripheral boundaries of the original solid state condition of the deposited particle.

When the mobility of the duplicating substance is high under the concurrent carbonization and sintering conditions a larger particle size may be used and where mobility is low a smaller particle size will be used.

Thus, in the examples of the process hereinafter set forth where the particle size of the colloidal dispersion is in a range from 0.1 to 0.5 microns, this is only by way of illustration for the type of colloid selected and the matrix being duplicated.

These fluid dispersions of the examples of the process set forth below have a mobility such that their particle size is sufficiently small and the concentration proper to faithfully develop the internal and external detail of the selected matrices such as cellulose paper, cotton cloth, etc, where the discrete fibers have a length of 500 microns and a diameter of 20–50 microns, a size almost gigantic in relative comparison to the particle size of the deposited colloid.

In either instance whether the mobility of the duplicating substance is high or low, concentration is adjusted to provide the degree of faithful duplication of the fiber geometry of the matrix desired.

As a rule, concentrations of 20 percent by volume of the colloid in a colloidal dispersion with a particle size between 0.1 to 0.5 microns will work favorably on 75 percent of the matrices to be duplicated. It has been found at this concentration that the thickness of the duplicate structure in the plastic or other duplicating substance is approximately equal to the matrix or model being duplicated.

Colloid concentration is best evaluated by microscopic examination of the duplicate structure.

If microscopic examination of the plastic duplicate reveals excesses of the duplicating substances on the surfaces and in the pores between the fibers of the duplicate structure, and in other ways lacks fidelity when compared to the original matrix, then by reducing the concentration of the colloid in the colloidal dispersion one may obtain the desired concentration to produce a sharp and faithful replica of the original matrix or model.

Conversely, if microscopic examination shows excessive shrinkage and weakness in structure, then the concentration of the colloid in the colloidal dispersion must be increased.

A proper combination of colloidal dispersion and wetting agent is one which enhances colloid particle stability, increases the flow properties of the continuous phase of the colloidal dispersion and increases the capillary action of the continuous phase of the colloidal dispersion into the fiber geometry of the matrix so that the colloid will be deposited by the colloidal dispersion homogeneously in, on, into and throughout the fiber geometry of the matrix.

A surfactant (wetting agent) such as Triton X 100 (Rohm and Haas) or of the class of polyethylene oxide (alkyl) phenol ethers, non-ionic wetting agents in a range between 0.2 percent and 10 percent by weight of the colloidal dispersions has been used effectively as is clear from the examples set forth below.

By the proper combination of colloid and wetting agent it has been found that the duplicated structure in the deposited duplicating substances will duplicate faithfully even to the point that joining will not occur between contacting but unconnected interlaced fibers of the original matrix being duplicated. The duplicate structure is found to have the same discrete fibers in the duplicated substances as existed in the matrix.

Where an organic suspension is used as the vehicle for the finely divided duplicating substance the solvent used will act to provide the desired stability of the particle of the substance and provide the desired surface tension of the continuous phase for the organic suspensoid to produce the same results obtained by the acqueous solloidal dispersion and wetting agents.

GENERAL STEPS

IMPREGNATING STEP:

Thus, in the present invention a matrix to be duplicated either in filament, sheet, object, or article form having the properties above set forth must first be selected. Materials, objects, articles and filaments made of cellulose, regenerated rayon, wool and the like materials illustrate matrices which fulfill these requirements.

Next an impregnating substance is selected in which to duplicate the matrix having the desired relation with this matrix at the carbonization temperature for the matrix and the necessary properties to effect infiltration and impregnation of the matrix.

The selected matrix is disposed so that it can be infiltrated and impregnated by the random deposition of a fine dispersion of the duplicating substance and this may be accomplished by any suitable technique.

If colloidal dispersions; organic suspensoids; latices, etc., are used as the component vehicles for the duplicating substance, the dispersions, suspensions, etc., may be deposited in, on, into, and throughout the fiber geometry of the matrix by spraying, dipping, rolling or by spreading as with a squeegee.

If the duplicating substance is in powder or crystalline form impregnation can be effected by vacuum deposition or other sublimation technique.

Any and all of these deposition techniques may be used alone or in combination, with the object, that the front, back, side ends, crevices, fissures, etc., on each fiber and in, into and about the internal and external surfaces of the fibers of the matrix and many of the interstitial spaces between the fibers will have randomly deposited thereon discrete particles of the colloid carried by the continuous phase of the dispersion or suspension.

This step or condition of the process is more readily understood by reference to FIGS. 1, 2, 5, and 6 of the drawings.

Figure 1:
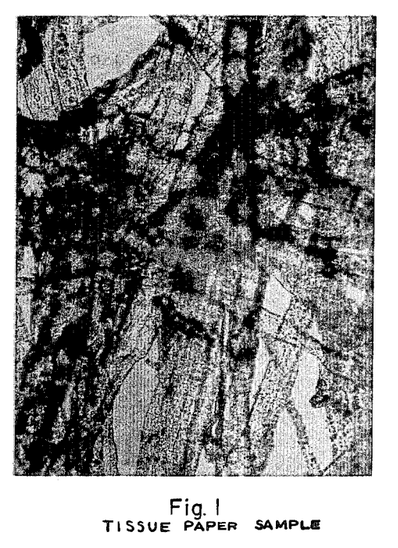
FIG. 1 is a representation of a photomicrograph at a magnification of about 200 diameters of a control sample of a conventional piece of tissue paper. The fibers shown in the tissue paper control sample are about 550 microns in length, and about 25–40 microns in diameter.

FIG. 1 shows microscopically the fiber geometry of a sample of conventional tissue paper befofe it has been impregnated by the duplicating substance. Note that the voids or interstitial spaces between the fibers of the matrix and the fiber construction itself is clear and well defined. Contrast this with the microscopic examination of the structure shown in FIG. 2.

Figure 2:
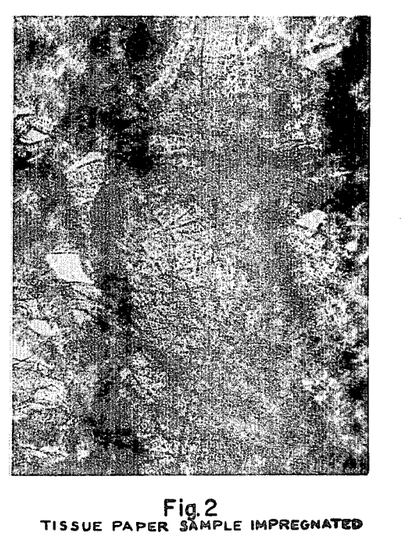
FIG. 2 is a representation of a photomicrograph on the same scale as FIG. 1 of the same kind of tissue paper impregnated with a deposit of a fine dispersion of a polyfluorocarbon resin by the procedure described in Example 2.

FIG. 2 shows the tissue paper sample impregnated with a duplicating substance in accordance with Example 2 hereinafter set forth. In this figure the fibers are now visible but blurred because of the presence of the translucent deposits of the plastic impregnating or duplicating substance in, on, about, or throughout to fibers of the tissue paper sample.

Figure 5:
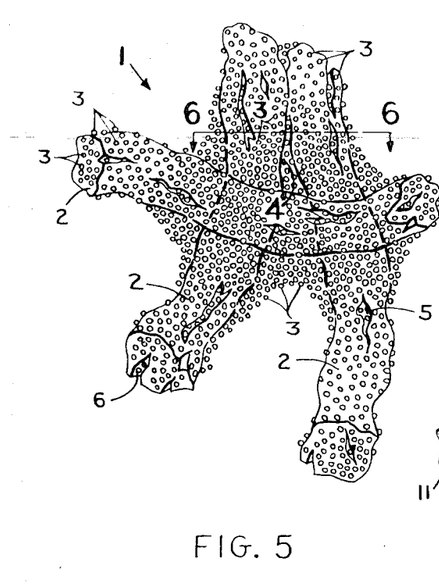
FIG. 5 is a diagrammatic perspective view of an enlarged portion of the fiber matrix of a control sample of conventional tissue paper after the finely divided particle of a deposited substance has infiltrated and impregnated the fiber matrix of the tissue paper and illustrates the discontinuous phase of the present invention.
Figure 6:
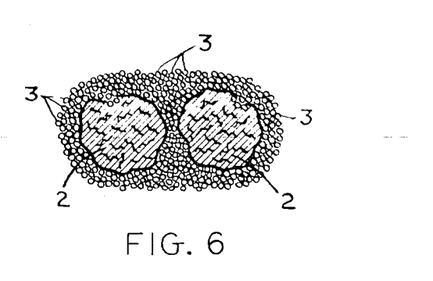
FIG. 6 is a cross section taken on line 6—6 of FIG. 5.

At FIGS. 5 and 6, a diagrammatic illustration of an enlarged section of the tissue paper sample generally designated 1 shows a few fibers 2 with the deposit of discrete particles as at 3 of the plastic duplicating substances. At least one of the interstitial spaces as at 4 is filled with the deposited discrete particles of the duplicating substances as are the crevices 5 and fissures 6.

As was pointed out, the relative size of the particles of the duplicating substance is an important factor in effecting the advantageous results of the present invention and the diagrammatic sketched attempt to show that the size of the particles is about 0.1 to 0.5 micron while the fibers are in a range of from 500 microns in length and 20 to 45 microns in diameter.

The impregnated matrix must now be put through a series of steps to eliminate the matrix and fully develop the substantial duplicate thereof in the duplicating substance with which it is impregnated.

Drying Steps:

If the duplicating substance deposited on the matrix with a sol or a solvent the impregnated matrix must be dried or the solvents evaporated so that only the discrete particles of the duplicating substance remain on the fibers of the matrix, and it will be recognized by those skilled in the art that regardless of the method of random disposition selected the final positions of the discrete particles will form from particles to particles a discontinuous film of the duplicating substance in, on, into and throughout the fiber geometry of the matrix.

Slow drying is preferred to prevent the formation of pits, flaws, scars or distortion of the surface of the duplicated fiber structure in the finished product and the drying process in effect is a slow modulation or change in two stages to the desired final condition where the sol or solvent has been dissipated.

In the first stage, for example, as drying of the colloid dispersion progresses a certain amount of the continuous phase, i.e. the water, will be driven off until at a certain concentration, the colloid, which is the true duplicating substance, will precipitate into its position relative to the fiber geometry of the matrix. After this occurs the remaining portion of the continuous phase of the colloid, the remaining water, can be driven off at a more rapid rate.

The final result to be achieved from the drying step is the matrix impregnated with only the discrete particles of finely divided duplicating substance.

This drying step can be accomplished by air drying (in a 150°F recirculating air oven) or by controlled infra red radiation.

Drying time will of course vary with the complexity and thickness of the matrix being dried.

When the impregnated matrix is fully dried the coextensive unit is ready for the steps of the process which will change the discontinuous film of the duplicating substance into an integral unit or continuous film of the duplicating substance from which the substantial duplicate of the matrix in the pure duplicating substance is established.

CARBONIZATION AND SINTERING

If the fiber geometry of th matrix has been impregnated with the proper concentration and particle size for the particular duplicating substance then because of the preselected properties of the matrix and the duplicating substance wherein the critical sintering temperature of the duplicating substance is well within the range of carbonization temperatures for the matrix; a gradual duplication of the matrix in the duplicating substance can be established or effected by simultaneous or concurrent controlled carbonization of the matrix on the one hand and sintering of the duplicating substance on the other.

Controlled carbonization of the matrix along with the advantageous changes in the surface energy of the particles of the deposited duplicating substance are key factors which regulate the extent of the formation of the duplicating substance into a faithful duplicate of the matrix.

The nature of the relation of the particle size and mobility of the particular duplicating substance selected on being raised to the sintering temperature as well as the effect of concentration to give the desired faithful duplicate has been considered above.

Controlled carbonization is effected by regulating the oxidation rate of the matrix through the various stages of the formation of its carbonaceous skeleton and controlled shrinkage and partial elimination of the skeleton as the concurrent steps of carbonization and sintering progress to produce the desired duplicate.

Broadly one result of the controlled carbonization conditions is to effect continuous local heat of combustion in the fiber geometry of the matrix to raise the temperature of the particles of the duplicating substance deposited in, on, into and along the discrete fibers above their critical sintering temperature thus causing the surface tension of these particles to become relatively lower than those between the fibers, increase their mobility and the movement of those particles between the fibers so that all the particles of the duplicating substance align, orient and coalesce in, on and along the internal and external surfaces of the discrete fibers to form a continuous unit, a duplicate of each fiber and hence that of the entire fiber geometry of the matrix.

Further, however, carbonization is preferably conducted under conditions where the rate of oxidation of the matrix is controlled in order to regulate the shrinkage of the matrix that is the reduction in volume of the fiber geometry of the matrix.

Shrinkage is desirable because it helps to increase the mobility of the deposited particles of the duplicating substance and thus it not only aids coalescing of the particles, but further increases the capacity of the particle to align and orient and as they coalesce in, on, into and along the fibers to replace or fill in the space left by the products of combustion formed during oxidation of the matrix and escaping between the coalescing particles of the duplicating substance.

Shrinkage is a function of the oxygen present during carbonization and is controlled by regulating the conditions of the atmosphere under which sintering is being effected. If the system is adjusted to recirculate approximately 60–70 percent of the hot air containing the gases of combustion and make up air in a range between 30 to 40 percent is added to the recirculated air an approximate overall shrinkage rate of 25 percent of the matrix will result. It has been found that when carbonization and the sintering schedule are controlled so that shrinkage is limited to about 25 percent of the overall area and volume of the original matrix that a relatively faithful duplicate of the discrete fibers and the overall fiber geometry of the matrix with good strength is obtained in the duplicating substance.

For example, for carbonization of a square yard of impregnated paper in a one cubic foot oven enough make up air is introduced to have at least one complete air change every minute. The mass of impregnated matrix will control the required quantities of oxygen that will have to be present to produce the desired shrinkage in the present process.

Generally for sintering time, the thinner the matrix the shorter the sintering period and vice versa for a thicker matrix.

The factors that affect and produce a weak structure in the duplicating substance are therefore clear.

a. Under sintering due to low temperature on improper timing produces insufficient coalescing of the duplicating substance, b. Proper sintering time and temperature but insufficient controlled carbonization will produce a weak structure because insufficient shrinkage will not permit the advantageous orientation and migration required to produce the desired continuous development of an integral unit in the duplicating substance.

Conversely excess sintering time, higher temperatures, not beyond the decomposition point of the duplicating substance, and increased oxygen can be used to increase shrinkage where it is desired to make a less porous duplicate structure.

Thus under atmospheric conditions, the dried impregnated matrix is subjected to an elevated temperature either at or above that temperature where carbonization of the fiber geometry of the matrix will occur.

So long as there is sufficient oxygen present and the temperature to which the matrix is subjected is above its carbonization temperature the fiber geometry thereof will undergo combustion and at the discrete fibers a local heat of combustion will be established which is above the critical temperature of the deposited particles of the duplicating substance, thus causing these particles to align and orient and to coalesce in, on and along all the internal and external surfaces of the discrete fibers on which the particles are deposited, and form the substantial duplicate of the matrix in the duplicating substance.

As carbonization of the fiber geometry of the matrix progresses, the carbonaceous skeleton forms combustion products which escape in the form of a gas between the coalescing particles of the duplicating substance and thus the fibers and the overall volume of the matrix to shrink under the oxidation conditions of the present process.

The function and effect of shrinkage as above set forth is to increase mobility of the particle of the duplicating substance and aid the particles to align and orient along the fibers.

Further under the effect of the sintering temperature not only do the particles coalesce but they fill in the voids left by the escaping products of combustion, however because this concurrent step is a gradual one and the characteristic initial stage dependant on a strong carbonaceous skeleton, there is gradual increase in the integrity of the particles of the duplicating substance as they coalesce into their continuous form and a coincident decrease in the form and structure of the discrete fibers on which the particles were deposited.

In order to speed up concurrent carbonization and sintering it has been found generally desirable to subject the impregnated matrix to an ambient temperature at least equal to but preferably higher than the critical sintering temperature for the duplicating substance. However, it will be understood that lower temperatures as well as higher temperatures can be used and carbonization controlled by varying the rate of oxidation as may be required by the particular conditions for any given impregnated matrix.

An elevated temperature of about 50°F higher than the critical sintering temperature for the duplicating substance is generally used in this concurrent carbonization and sintering steps of the present process because as coalescing of the duplicating substance causes a more continuous unitary structure to form it will slowly act to occlude oxygen from reacting with the discrete fibers of the matrix or the remaining portion of the carbonaceous skeleton that have not undergone combustion and therefore a higher temperature is required to effect outgoing of the products of combustion.

The Sintering and Carbonization leave a homogeneous deposition of carbonaceous ash throughout the now integral and continuous unit of the duplicated matrix now formed of the duplicating substance.

In order to better understand this step, reference will be made to FIGS. 3, 7 and 8 of the drawings in which a sintered sample of an impregnated tissue paper matrix is illustrated.

Figure 3:
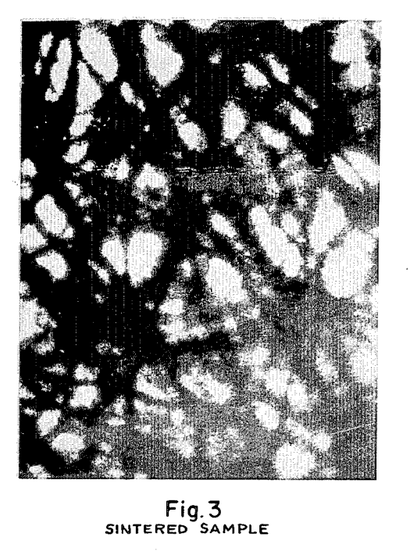
FIG. 3 is a representation of a photomicrograph on the same scale as FIG. 1 of a charred piece of the coextensive tissue paper control sample with its deposit of polyfluorocarbon resins of FIG. 2.

In FIG. 3, the pigment like particles of carbon appear clearly on the surface of the individual fibers of the plastic matrix formed from the duplicating substance. However, of even greater significance is that the voids or intersititial spaces between the fiber are now clearly defined and have increased in number as compared with the same spaces of the impregnated tissue paper shown in FIG. 2.

The increase in the interstitial spaces came about as a result of the combined acts of aligning; orienting along the fibers and sintering or coalescing which occurs to the discrete particles of the deposited duplicating substance.

Figure 7:
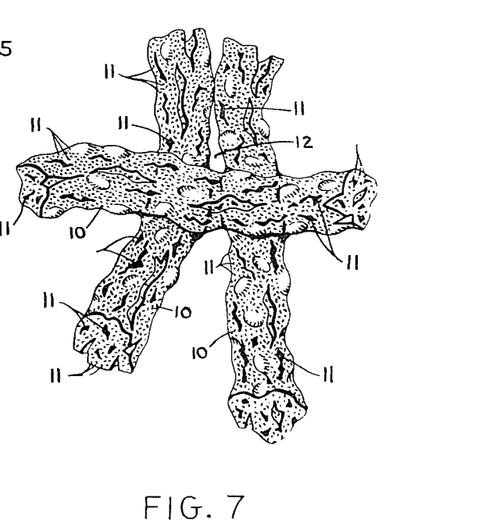
FIG. 7 is a diagrammatic perspective illustration of the enlarged portion of the fiber matrix of FIG. 5 after the deposited substance has been sintered and illustrates the continuous phase of the plastic duplicate as being 25 percent smaller in volume than the original fiber matrix of the tissue paper sample.
Figure 8:
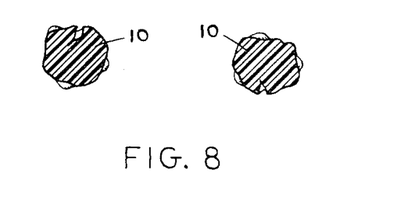
FIG. 8 is a cross section taken on line 8—8 of FIG. 7.

In FIGS. 7 and 8, a diagrammatic illustration was made to show how the enlarged section of impregnated fiber matrix of FIG. 5 would look after the concurrent steps of sintering and carbonization have been completed and the fibers 10 in these fibers are now duplicates geometrically in the duplicated substance but slightly smaller in volume and have homogeneously disposed thereon and therethrough carbon particles 11 of various sizes. The interstitial space 12 between these duplicate fibers however is now clean and sharp to show the orientation of the particles that occured with the sintering and carbonization step which causes them to migrate and form somewhat smaller but geometric equivalents of the original fiber.

The carbonaceous residue of the matrix which is present in the duplicate structure made of the duplicating substance can now be removed by any suitable type of oxidation-reduction procedure to provide a duplicate in the pure duplicating substance. The availability of the particles of the carbon residue to oxidizers is made possible by the blowing out of minute passages by the gases of combustion from the carbonizing of the fibers of the matrix to form passage by which the oxidant may subsequently enter.

OXIDATION-REDUCTION STEP

Such oxidation-reduction steps can be accomplished by passing hot air over the sintered product; by refluxing in nitric acid ($HNO_3$ and/or Hydrogen peroxide ($H_2O_2$); by refluxing in aqua regia ($HCL/HNO_3$) at an elevated temperature; by refluxing 1N $HNO_3$ (five minutes to two hours) and then bleaching in 30–35 percent Hydrogen Peroxide five minutes to two hours and or 5–15 percent sodium hypochlorite or combinations of both.

The sintered and oxidized duplictate is then hydrolyzed and washed in distilled water until it is free of acid and then dried as by hot air or evaporation at room temperature to give the finished duplicate in the duplicating substance.

Figure 4:
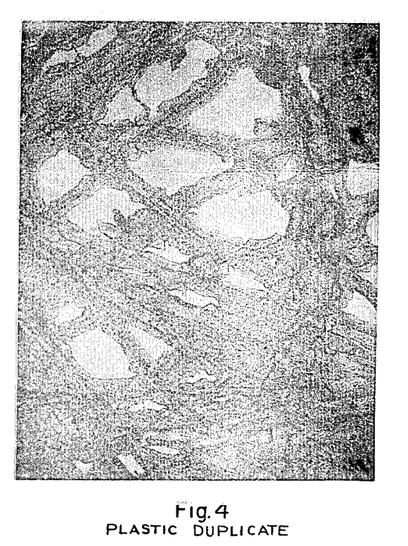
FIG. 4 is a representation of a photomicrograph on the same scale as FIG. 1 of the pure polyflurorcarbon resin duplicate of the control sample of tissue paper made according to the method of Example 2.
Figure 9:
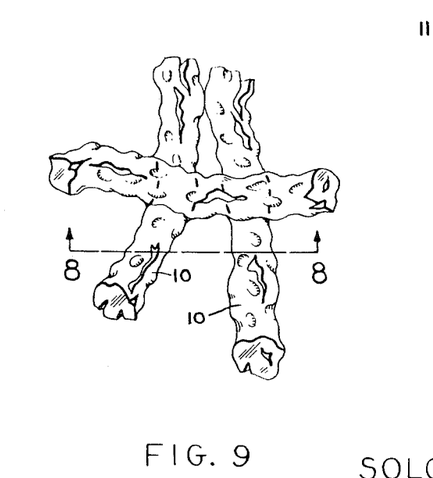
FIG. 9 is a diagrammatic perspective illustration of the enlarged portion of the sintered plastic duplicate of FIG. 7 after it has been oxidized.

In FIGS. 4 and 9 of the drawings the final product is shown wherein homogeneously disposed carbon residue have been oxidized to leave the pure duplicate in the duplicating substance.

The fibers in FIG. 9 are fibers shown in FIG. 7 after they have been put through the oxidation-reduction step, and are clearly smaller in size by some 25 percent.

It is significant to note particularly by comparison with FIGS. 1 and 4 of the drawings that the original matrix and the duplicate matrix in the duplicating substance bear such close resemblance to each other that it is difficult to detect significant difference. Even the discrete fibers in the duplicate are clearly distinguishable relative to each other.

Examples of specific matrices duplicated by the general step of the present process are as follows:

EXAMPLE 1

Porous non-woven polyfluorocarbon resin duplicate of a matrix of woven cloth material.

A 20 percent by volume colloidal dispersion of polyfluorocarbon resin "TFE 30" (Dupont TM) (average particle size 0.2 micron) containing 2 percent TRITON × 100 wetting agent was prepared and a cotton bed sheet was dipped into the colloidal dispersion until the bed sheet was fully saturated.

The cotton bed sheet was then stretched and dried at room temperature and was found to be impregnated with a flaky deposit of polyfluorocarbon resin.

The impregnated cotton bed sheet was placed in a suitable sliding frame to allow for shrinkage and the impregnated cotton bed sheet and frame were placed in a controlled oxygen 670°F recirculating forced air oven for about 20 minutes.

The product removed from the oven was integral and covered with fine particles of carbon which gave it a blackened appearance.

The blackened product from the sintering over was cooled and then placed in a reflux assembly of 63 percent $HNO_3$ and allowed to reflux for 16 hours at 115°C until all the carbon was oxidized and the characteristic pure white polyfluorocarbon resin counterpart was developed. The material was removed from the reflux assembly and washed in a dilute ammonia solution followed by distilled water and then dried in a forced air over form 10 minutes at 250°F.

The final product had all the characteristics of sintered polytetrafluoroethylene and was structurally a duplicate of the cotton bed sheet except for size. The plastic duplicate was about 25 percent smaller in area.

Specific gravity tests on samples of this final product gave a specific gravity of 2.2 which is the specific gravity of polytetrafluoroethylene and proved the absence of occluded gases.

EXAMPLE 2

POLYFLUOROCARBON RESIN DUPLICATION OF MATRIX OF PAPER PULP

A 30 percent by volume colloidal dispersion of polyfluorocarbon resin "41BX" (Dupont TM) and (Dupont TM) (average particle size 0.2 micron) containing 4 percent TRITON × 100 wetting agent was prepared.

A tea bag made of Philippine hemp fibers was dipped into this colloidal dispersion and dried in an oven, at 150°F.

The impregnated tea bag had a flaky coating of polytetrafluoroethylene.

The impregnated tea bag was placed between two stainless steel screens and locked in position in such a manner that the top screen did not rest on the paper and the entire assembly of frame and plastic impregnated tea bag was placed in a controlled oxygen 670°F recirculating forced air oven for 10 minutes, at which time the product formed was integral and covered with the characteristic particles of carbon residue which give it a blackened appearance.

The tea bag was removed from the oven and placed in a reflux assembly having 63 percent on one normal Nitric Acid therein and the tea bag was allowed to reflux for six hours at 115°C at which time the tea bag turned from black to yellow.

The tea bag was then placed in a second reflux assembly containing 33–35 percent Hydrogen Poroxide and allowed to soak at 60° – 80°C until the characteristic white color of the polyfluorocarbon resin was established.

The plastic counterpart was then dried in a 250°F forced air oven and its specific gravity tested to confirm that the final product was the polyfluorocarbon resin.

EXAMPLE 3

Polyfluorocarbon Resin Duplication of a three dimensional Matrix of paper pulp material A paper thimble made of filter paper pulp (Sohxlet extractor thimble) was selected. The thimble was dipped into a 20 percent polytetrafluoroethylene dispersion containing 2 percent TRITON ×100, and the dispersion was allowed to soak well into the structure. The thimble was dried by standing it on a metal grid placed over a pan into which a stream of compressed air was being pumped at 4 P.S.I. After drying overnight, the thimble was placed in a 120°C oven for four hours.

The impregnated thimble was then placed on a porous metal frame which is 25 percent less in volume than the thimble but identical in shape, and frame, and the thimble was then placed in a container which has helos drilled both on the bottom and top.

Container frame and thimble assembly was placed in a 670°F oven for 35 minutes and then removed from the oven. Then only the frame with the thimble was placed back in the oven for 15 minutes more at 670°F, and the frame and thimble was then removed from the frame, cooled and placed in a reflux assembly and refluxed in 63 percent nitric acid for 16 hours at 115°C, followed by warming for four hours in 30–35 percent Hydrogen Peroxide at 60°–80°C until the characteristic white color of the polyfluorocarbon resin appeared. On test the specific gravity of 2.2 was obtained.

EXAMPLE 4

Polyfluorocarbon Resin Duplicate of a Matrix of Commercial Tissue Paper

A sheet of commercial tissue paper (Kimberly Clark's "Kimwipes") was saturated by a 35 percent colloidal solution, by weight, of a polyfluorocarbon resin dispersion containing 9 percent TRITON × 100 (Rohm & Haas).

The particle size range of the dispersion (Dupont's TFE3120) did not exceed 0.2 micron.

The paper was treated by causing the dispersion to enter the fibers by capillary action.

The wet impregnated sheet of tissue paper was dried by suspension in a 150°F air circulating oven for 30 minutes.

The dried impregnated sheet of tissue paper was then installed in a suitable jig fabricated of flat metal screen where the sheet is held lightly but taut along the edges in order that shrinkage and sliding may take place uniformly during the carbonizing process. This was readily done by forming troughs around the periphery of the screen and using small steel balls as clamps to hold the edges of the paper in the trough.

Then the jig was placed in a 670°F muffle furnace, door slightly ajar, for 12 minutes and sample was removed from the furnace and allowed to cool while still in the jig.

The carbonaceous residue was removed by placing the sheet in a suitable reflux assembly containing nitric acid, and refluxing at the boiling point of the acid until the characteristic white color of the polyfluorocarbon resin developed.

The sample was neutralized by dilute ammonia, washed in deionized water, and pressed dry between paper towels. On test the specific gravity of the sample was 2.2.

MODIFICATIONS OF THE GENERAL STEPS OF THE PROCESS

In addition to the changes in properties of the final duplicate product which can be produced by variation of the sintering and carbonization conditions, other modifications or variations of the above described process can be made to produce a variety of other properties in the final duplicate plastic product.

For example the duplicate plastic product can be made stronger or softer or receive a colored decorative pattern, have its texture altered or take on certain electrical properties or ion exchange properties, etc.

A representative sampling of the potential areas of modification will now be described.

A. Modifying or Treating the Matrix before the Impregnating step.

Since the above described process except for dimensions makes a substantially identical duplicate of the matrix, the initial condition of the matrix will have bearing on the ultimate product obtained.

Conversely, where it is desired to produce an ultimate product with certain given properties then one way of obtaining these properties will be to initially invest the matrix to be duplicated with such property in a manner which will permit this property to be transferred over to the duplicate.

Relatively simple modifications of the above described process accomplishing these results are now illustrated:

EXAMPLE 5

Direct treatment of the Matrix - Acid Hardening - Corresponding Plastic Duplicate In order to obtain a hard finish, a piece of conventional paper stock was acid hardened.

This hardened piece of conventional paper stock was used as the matrix in the procedures outlined in Example 4.

The product obtained was plastic duplicate of the initial matrix hardened in the same manner.

EXAMPLE 6

Direct treatment of Matrix - Partial Hydrolysis - Corresponding Plastic Duplicate A piece of conventional paper stock was partially hydrolyzed to give it a soft texture and the treated paper was used as the matrix in the procedures outlined in Example 4.

The product obtained was a rather soft plastic duplicate equivalent to the texture of the initially treated matrix.

B. Pre-impregnating or Two Stage Impregnation of the Matrix - (Incompatable Duplicating substances).

Probably the most versatile means for altering the properties of the final product is to add a pre-impregnating step or conduct the impregnation in two or more steps to develop a certain property such as giving the final product conductive properties, or adding filler to increase the opacity of the final product.

Pre-impregnation of two-stage impregnation is relied on where the impregnating substances are not compatable or where it is necessary to obtain some desirable result such as the printing of a pattern on the plastic duplicate.

EXAMPLE 7

Conductive Polyfluorocarbon Resin Duplicate from a Matrix of Tissue Paper

A one normal solution of a decomposable metal compound $FeCl_3$ was prepared and a weighed sample of the tissue paper was dipped and saturated with the solution.

The pre-impregnated tissue paper sample was exposed to $NH_4CH$ to change the ferric salt to the ferric hydroxide in accordance with the equation.

$$2 FeCl_3 + 6NH_4OH \rightarrow 2Fe(OH)_3 + 6NH_4Cl$$

The tissue paper sample was then heated in an oven at 150°C until all the sublimable $NH_4CL$ salt was driven off.

The metal hydroxide impregnated paper was dried and weighed to calculate the metal content present.

The metal impregnated tissue paper sample was then passed through all the steps of Example 2 above subject to the following modification.

Initially, carbonization is carried out in a limited oxygen atmosphere until the ferric ion is oxidized to the pure ferrous element in accordance with the following equations:

$$2 Fe(OH)_3 \rightarrow Fe_2O_3 + 3H_2O$$

$$2 Fe_2O_3 + 3C \rightarrow Fe + 3CO_2$$

When the oxide is reduced, the oxygen and heat are increased to carbonize the tissue paper sample.

Similarly, in the oxidation-reduction step with $H_2O_2$, where the iron element will be oxidized to ferric oxide according to the equation:

$$4Fe + 3O_2 \rightarrow 2Fe_2O_3$$

it is necessary to reduce the ferrous oxide back in a Hydrogen or reducing atmosphere, as follows:

$$2FE_2O_3 + 6H_2 \rightarrow 4Fe + 6H_2O$$

In this modification of the general steps of the process the product obtained had a gray color. A current of electricity passed from one end of the sheet to the other as measured with probes from a current carrying circuit and a galvanometer.

EXAMPLE 8

Polyfluorocarbon Resin Duplicate with Filler to Increase Opacity

1. A 20 percent by volume polytetrafluoroethylene dispersion is prepared as in Example 1.
2. Titanium tetrachloride solution 100 percent is poured into an argon purged open vessel.
3. A steam vaporiser is activated.

Dip a piece of acid resistant filter paper into the $TlCL_4$ solution. Allow excess to drip off and then expose both surfaces to the steam of the vaporiser for 10 minutes on each surface. Wash paper in dilute ammonia, then distilled water until no chloride (as detected by silver nitrate) is present and dry in an oven at 150°F. for one hour.

Dip titania impregnated paper in the polytetrafluoroethylene dispersion, let dry at room temperature or at 150°F. for 30 minutes. Sinter a 670°F. for 15 minutes in the forced air one pass oven between stainless steel screens as in Example 4.

Place material, after cooling to room temperature, in a reflux assembly containing 30–35 percent hydrogen peroxide and 2 percent Triton × 100. Reflux at 60°–80° C. for 24 hours or until the characteristic white polytetrafluoroethylene color is obtained.

EXAMPLE 9

Polyfluorocarbon Resi Duplicate of a Matrix Having a Fluffy Texture.

1. A 20 percent by volume polyfluorocarbon resin dispersion of "TFE 30" (Dupont T.M.) is prepared as in Example 1.
2. An Amino-Triazole solution 15 percent is prepared.

A piece of conventional cotton cloth was dipped in the Amino-Triazole solution and after it was removed the excess was allowed to drip off.

The pre-impregnated cloth was then allowed to air dry.

The dried pre-impregnated cloth was then sprayed until saturated with 20 percent "Teflon 30" solution contains 2 percent wetting agent and was put thru all the procedures set forth in Example 1.

As a result of the outgassing of nitrogen previously, the duplicated plastic product had a fluffy somewhat cottony texture.

EXAMPLE 10

Selective Pre-impregnation to Form a Pattern on the Polyfluorocarbon Resin Duplicate A piece of conventional paper was selected which was capable of being wetted or impregnated without running by the vehicle in which the coloring material is suspended.

Acqueous suspensions of graphite which yields a gray to black effect; chrome oxide which yields light to dark green effect and iron oxide which yields a brown to black effect were prepared in various concentrations between 2 to 10 percent by weight. These pigments familiar to the decorative arts industries are readily available on the open market, are thermally stable at the sintering temperatures and resist selective oxidizers used during the oxidation-reduction step of the process.

The acqueous suspensions of the respective dyes were applied by dipping a stamping member in the pigment and then stamping the paper in a predetermined color decorative pattern.

The paper was oven dried at 150°F to remove the solvent in which the pigments were suspended.

The printed paper was now passed thru the steps of the process as outlined in Example 4.

The plastic duplicate obtained had a specific gravity of 2.2 and had the printed pattern found therein throughout the discrete fibers as in the original paper matrix duplicated.

The crux of this type of selective pre-impregnated or the formation of printed plastic material is to select pigmenting materials which are more stable to the oxidizing agents used then the carbon residue of the fiber geometry of the matrix.

Prolonged oxidation is to be avoided. However if the background of the plastic has a yellow cast refluxing the plastic duplicate with the pattern can be done up to two hours in a 5 percent hypochlorous acid solution to bleach out the plastic if care is taken to avoid oxidizing out the printed pattern by over bleaching.

EXAMPLE 11

Multiple Polyfluorocarbon Resin Duplicate of a Matrix of commercial tissue paper A sheet of commercial tissue paper (Kimberly Clark's "Kemwipes") was saturated by a 10 percent by weight of a finely divided organic suspension of polynonochlortrifluoroethylene and the tissue paper with this first impregnation of plastic material was thoroughly air dried for 8 hours.

The tissue paper with the first impregnation was then put through all the steps set forth in Example 4 above.

On the test the specific gravity of the sample was 2.2 and the sample was stronger and more resilient in texture than the plastic duplicate formed by the single impregnation step of Example 4.

c. One stage impregnation of the matrix with more than one duplicating substance.

Another convenient technique for producing or altering the properties of the final product obtained in accordance with the general steps of the process above described is to co-deposit duplicating substances which are compatable with each other.

EXAMPLE 12

Silicon Dioxide ($SiO_2$) + Polytetrafluoroethylene Dispersions

The $SiO_2$ is added to the polyfluorocarbon resin dispersion as a dry powder 29 to 50 percent by weight was mixed thoroughly with the dispersion and the mixture was applied as set forth in the impregnating steps of Examples 1, 2 and 4 above.

The product obtained with a silica filled plastic duplicate with a specific gravity of 2.1.

EXAMPLE 13

Titanium Dioxide ($TiO_2$) + Polytetrafluoroethylene dispersion

The $TiO_2$ is added to the polyfluorocarbon resin dispersion as a dry powder 5 to 25 percent, by weight was mixed thoroughly with the dispersion and the mixture was applied as set forth in the impregnating steps of Examples 1, 2 and 4 above.

The product obtained was a titania filled plastic duplicate with a specific gravity of 3.1.

EXAMPLE 14

Nickel Carbonyl Powder and Polytetrafluoroethylene Dispersion

The nickel carbonyl Powder having a particle size not greater than 0.2 microns is added to the polyfluorocarbon resin dispersion as a dry agent 5 to 25 percent by weight was mixed thoroughly with the dispersion and the dispersion mixture was applied as set forth in the impregnating steps of Examples 1, 2 and 4 above.

The product obtained was a nickel filled plastic duplicate with a specific gravity of 3.4 which was highly conductive from end to end when tested.

Similar products made with Iron Carbonyl and Platinum powders produced the same type products and results.

EXAMPLE 15

Multiple Polyfluorocarbon Resins Duplicate Of a Matrix of Commercial Tissue Paper A sheet of commercial tissue paper (Kimberly Clark's "Kemwipes") was saturated in acqueous solutions consisting of a mixture of the following:
  a. 10 percent by weight polytetrafluoroethylene with 1 percent Triton × 100.
  b. 15 percent by weight of polyparfluorinated ethylene propylene copolymer with 2 percent Triton × 100

Thereafter the impregnated tissue paper was taken through all the same steps set forth in Example 4 above.

The product obtained was a plastic duplicate of the original tissue paper with specific gravity of 2.2. The product as in the case of Example 11 was stronger than the plastic duplicate obtained by the single duplicating substance used in Example 4.

d. Modifying the Process to strengthen the Final Product

One way to strengthen the final product obtained by the general steps of the process is to increase the sintering temperature and time or the oxidation rate as this will increase coalescence and reduce porosity of the final duplicate plastic product obtained.

Still another method is to reimpregnate the sintered plastic duplicate with additional duplicating substance either before or after the oxidation-reduction step of the general steps of the process above described.

EXAMPLE 16

Prestressing to Strengthen the Polyfluorocarbon Resin Duplicate

All the steps of Example 2 were followed up to the completion of the sintering and carbonization procedures.

Thereafter, the sintered plastic duplicate is removed from the sintering furnace and immediately plunged into a cold water bath maintained at about 32°F until the temperature of the plastic duplicate drops below the transition temperature at 621°F.

The prestressed plastic duplicate was then taken through the remaining steps as set forth in Example 2 to provide the final plastic duplicate product.

This product has a 2.2 specific gravity and had a tougher and more resilient texture than the plastic duplicate obtained by the steps set forth in Example 2.

EXAMPLE 17

Annealing Technique

All the steps of Example 2 were followed up to the completion of the sintering and carbonization procedures.

Thereafter the temperature in the sintering furnace was permitted to reduce at the rate of 1°F per minute until a temperature of 500°F was passed.

The annealed plastic duplicate was then taken through the remaining steps as set forth in Example 2 to provide the final duplicate plastic product.

This product as Example 16 was stiffer and less resilient than the plastic duplicate obtained by the steps set forth in Example 2. The specific gravity was 2.2.

EXAMPLE 18

Redipping the Polyfluorocarbon Resin to Strengthen it.

All the steps of Example 2 were followed.

The final plastic duplicate was then redipped in the 30 percent by volume colloidal dispersion of polyfluorocarbon resin "41BX" (Dupont T.M.) and "TFE 30" (Dupont T.M.) containing 4 percent Triton × 100 wetting agent; and air dried for two hours.

The dried redipped plastic duplicate was then placed in a sintering furnace and resintered at 670°F for a relatively short period of time about 12 minutes, an extra shrinkage will occur the longer the product is maintained at the sintering temperature.

The product obtained was measurably tougher and more resilient than the corresponding single dipped plastic duplicate made by the steps of Example 2.

Note that redipping can also be effected before oxidation but resintering will have to be effected at 725°F in the presence of oxygen and the time period controlled to prevent undue shrinkage.

e. Modifying the Process to Post Coat with resintering.

It is possible to give the final duplicate plastic product different properties by post-coating the product.

EXAMPLE 19

Polyfluorocarbon Resin Duplicate with a Bacteriocidal Coating.

All the steps of Example 4 were followed and the final plastic duplicate obtained.

Then the finished plastic duplicate was redipped in a bacteriocidal agent, mercurochrome, and the product dried.

EXAMPLE 20

Polyfluorocarbon Resin Duplicate with Ion Exchange Coating.

All the steps of Example 1 were followed and the final plastic duplicate sheet material was obtained.

Thereafter the plastic duplicate bed sheet was dipped into an ion exchange resin solution of a sulphonic acid derivative of polyetyrene and the product was air dried.

The bed sheet was cut up into shapes which permitted the material to be substituted in conventional apparatus using ion exchange membranes and the product produced improved results over that of corresponding materials now used.

GENERAL COMMENTS AND FACTS REGARDING THE PROCESS: PREIMPREGNATION, SINGLE STAGE IMPREGNATION WITH CO-DEPOSITING OR MULTI-STAGE IMPREGNATION

It is believed clear that impregnation can be varied at will and that compatable and incompatable substances of the correct particle size can be deposited during the impregnation step to obtain the desired property.

The general condition required is that where noncompatable substances are deposited separately the matrix should be dried between each depositing step.

Any number of impregnation steps therefore can be undertaken. For example, a titanium filled printed plastic duplicate can be obtained as by combining Examples 8 and 10.

Further as will appear clear hereinafter the modified impregnation steps can be correlated with post treating steps to produce other desirable results.

It should be noted that where the duplicating substances are varying forms of polyfluorocarbon that whether they are compatable or not they can be deposited on the matrix with respect to each other in all ratios of 1 to 100 percent by weight.

Further where a multiple selection of polyfluorocarbon resins are deposited the matrix for all purposes is treated as if only a single resin has been deposited as the highest sintering temperature for the respective polyfluorocarbon resins deposited will control the sintering temperature at which the matrix is held.

Microscopic inspection of the final product duplicate in all of the examples show that they are substantial duplicates in all respect to the original fibers of the matrix.

The effect of redipping and resintering on pore size is illustrated by the following data.

1. Using a Whatman No. 4–47mm disk of filter paper as the matrix respectively; three plastic duplicate filters were made. Sample PA had one impregnation. Sample PB had one impregnation and one redip. Sample PC had one impregnation and two redips.
2. Test data on these samples were obtained as follows:

| Whatman | FLOW<br>No. 4 Filter-47 mm Disk 500 cc<br>$H_2O$ | TIME<br>10 sec. |
|---|---|---|
| Sample PA | Filter-47 mm Disk 500 cc $H_2O$ | 16 sec. |
| Sample PB | Filter-47 mm Disk 500 cc $H_2O$ | 34 sec. |
| Sample PC | Filter-47 mm Disk 500 cc $H_2O$ | 335 sec. |

Tests would further appear to indicate that where filter paper is the matrix the porosity of the plastic duplicate made in accordance with Example 4, a one impregnation procedure, will be reduced approximately 40 percent of the porosity of the original matrix.

Porosity is believed to be closely related to shrinkage and therefore it is desirable during the process to prevent the dried impregnated matrix from going its own way during the sintering and carbonization steps as by the use of a frame or by keeping the matrix under some tension as is done in the apparatus for performing the general steps of the process which apparatus will now be described.

Where the duplicating substance sinters or coalesces below the thermal decomposition point for the matrix to be duplicated then the present process must be modified in the steps which rely on the relation of the matrix and the duplicating substance, thus pre-sintering and hydrolizing in a temperature controlled medium acts to coalesce the duplicating substance and simultaneously destroys or eliminates the matrix in a manner similar to the relationship established by sintering and carbonization.

APPARATUS FOR CONTINUOUS OPERATIONS OF PROCESS

Figure 10:
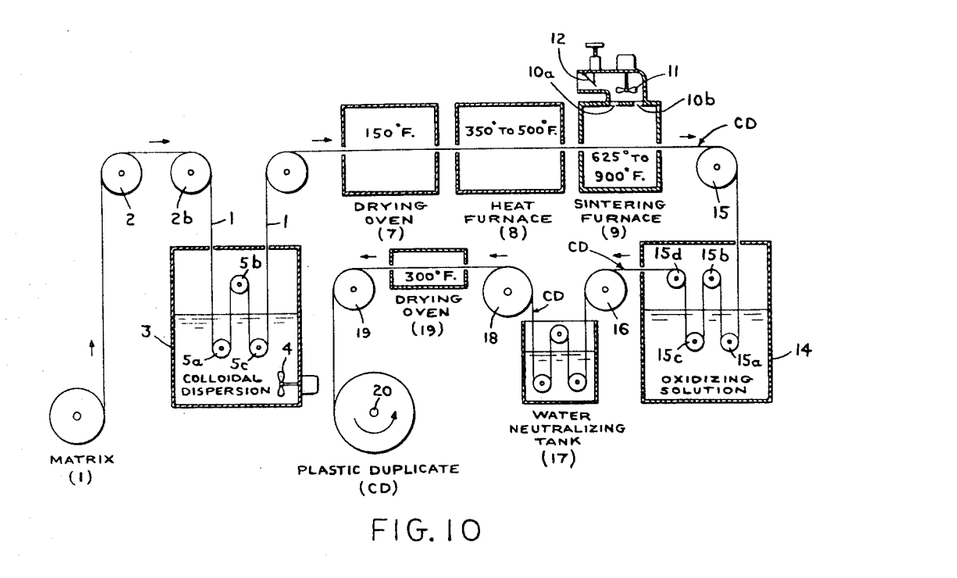
FIG. 10 is a diagrammatic illustration of one form of apparatus to accomplish the method of the present invention.

Referring further to the drawings, FIG. 10 shows an apparatus for performing the process of the present invention in a continuous manner.

Thus there is shown at 1 a Matrix in the form of a roll of material i.e., paper, textile fabric, cellulose sheeting, viscose sponge, fabric, regenerated rayon cloth etc, which has sufficient strength to travel preferably unsupported through the various steps of the process and is maintained under suitable tension by any suitable means.

The Matrix is passed over rollers 2 and 2b, into a tank 3 which contains a collodial dispersion having the concentration and particle size and wetting agent for this particular Matrix. In the tank 3, the colloidal dispension may be agitated as by a mixing member 4 so as to deposit the colloidal dispersion as thoroughly and homogeneously as possible on the Matrix as it passes through the tank 3.

As shown, the Matrix 1 is disposed in the tank to pass over rollers 5a, 5b and 5c so that it can make at least two passes through the collodial dispension. It is believed clear that if additional passes are needed that the tank 3 can be expanded and the number of rollers increased to accomplish this result.

Matrix 1 now impregnated with colloid and the continuous phase of the colloidal dispersion from its pass through the colloidal dispension in tank 3 moves over roller 6 into a low heat drying oven 7 where a gentle baking heat of 150°F. acts to evaporate the water present in the impregnated Matrix and leaves the discontinuous particle stage of the present invention on the Matrix.

Next, the dried impregnated Matrix 1 passes through a heat furnace 8 between 350°–500°F. where the wetting agent is removed more rapidly and carbonization of the Matrix is commenced.

After passing from furnace 8, the dried impregnated Matrix 1 with the colloid still in discrete particles thereon is then sent into a sintering furnace 9 at 625°F to 900°F where the combined steps of sintering and carbonization occur to simultaneously coalesce the discrete particles of colloid in the fibers of the Matrix into a continuous self-supporting duplicate of the fiber geometry of the Matrix and to oxidize by controlled combustion the fibers of the Matrix.

Parts 10a and 10b coacts with a fan 11 and damper 12 as illustrated diagrammatically to control the recirculation of air in the sintering furnace 9 whereby the desired rate of combustion will be effected.

At some point in the sintering furnace 9 the Matrix 1 decomposes and the duplicating substance forms into continuous unitary duplicate thereof in which the carbonaceous residue of the fiber geometry of the Matrix is homogeneously disposed so that as it passes from the sintering furnace 9 it will have a characteristic blackened or charred appearance.

The sintered duplicate CD is now passed from the sintering furnace 9 over the roller 13 into an oxidizing chamber 14 where any suitable oxidation-reduction procedure can be performed which acts to remove the deposited carbon residue from the sintered plastic duplicate.

For example, boiling solution of one normal $HNO_3$ can be used for this purpose or even hot air at elevated temperatures will accomplish this result.

In the illustrated embodiment of the apparatus, the sintered plastic duplicate CD is passed into a suitable oxidation solution over rollers 15a, 15b, 15c and 15d to permit it to make several passes into this oxidation medium.

From the oxidation chamber 14 the treated plastic duplicate CD is past over roller 16 into a washing and neutralizing tank 17, then over roller 18 into a drying oven 19 at about 300°F.

From the drying oven the final duplicate plastic sheet is passed over a roller 19 and wound on a suitable storing rod 20 for its eventual shipment and use.

It is believed clear from the process steps and the apparatus for performing the process as above described that a multitude of matrices can be reproduced by the present process in an extremely wide range from tissue paper to a complex suit of clothes to any articles, object or goods, in materials having the properties which adapt it for the necessary relationship with the duplicating substance selected.

Conversely the myraid of duplicating substance will provide a multitude of new and unusual products, particularly plastic products adapted not only to function and obtain results similar but superior to those of the matrix from which they have been duplicated but further offer a variety of new products which have been long sought after by many industries but not yet achieved because of the limitation in the technical advances relative new plastic materials on the market.

Therefore although this invention and a variety of modified forms thereof have been described and illustrated by reference to certain specific examples and various expressions or terms of description have been utilized herein in an effort to set forth the invention clearly, such illustrated examples or terms of description are not intended to be by way of limitation or to exclude any equivalents of the features shown and described; and it is realized that numerous modifications are possible within the scope of the invention as now claimed.

What is claimed is:

1. A plastic material, article, or object formed as a substantial duplicate in high molecular weight polymeric material selected from the group consisting of polyfluorocarbon resins, polyvinyl chloride and polyvinylidene chloride of a matrix of fiber materials by the process of:

selecting the matrix to be duplicated from the group consisting of fibrous cellulosic and proteinacious material which will carbonize;

impregnating the matrix by randomly depositing on and along the discrete fibers of the matrix finely divided particles of at least one duplicating substance of high molecular weight polymeric materials selected from the group consisting of polyfluorocarbon resins, polyvinylchloride and polyvinylidene chloride having a sintering temperature at the carbonizing temperature for the particular fiber structure of the matrix selected;

subjecting the impregnated matrix to an elevated temperature less than the ignition temperature for the fibers of the matrix in an atmosphere having oxygen present to oxidize the fibers into carbonaceous form, maintaining continuous oxidation at the elevated temperature of the carbonized fibers with sufficient oxygen present that the temperature conditions along the carbonized fibers will at least equal the sintering temperature of the duplicating substance and will cause the discrete particles of the duplicating substance deposited thereon to align and orient along the carbonized fibers of the matrix;

controlling the concentration of oxygen present during said continuous oxidation of the carbonized fibers of the matrix at the elevated temperature to limit and regulate the rate of oxidation and elimination of the carbonized fiber structure and the decrease in mass of the matrix whereby the aligned and oriented particles of the duplicating substance of the sintering temperature along the carbonized fibers will gradually replace the carbonized fibers as they are eliminated under the controlled oxidation conditions and will coalesce to form a self-supporting continuous duplicate in the duplicating substance of the fiber structure of the matrix, and separating the residue of carbonaceous ash of the fiber structure of the matrix from the substantial duplicate thus formed to provide the finished plastic material, article or object.

2. The plastic material, article or object of claim 1 formed from a plurality of the said high molecular weight polymeric materials at least one of which is a polyfluorocarbon resin.

3. The plastic material, article or object of claim 1 including:

materials combined with at least one of said high molecular weight polymeric materials selected from the group consisting of silica and titania to increase the opaqueness of the plastic material, article or object.

4. The plastic material, article or object of claim 1 including:

materials combined with at least one of the said high molecular weight polymeric materials selected from the group consisting of metal carbonyl compounds and pure metal powders to increase the conductive properties of the plastic material, article or object.

5. The plastic material, article or object of claim 1 wherein the substantial duplicate is coated with a bactericidal agent after duplication of the matrix is completed.

6. The plastic material, article or object of claim 1 wherein the substantial duplicate is coated with an ion exchange resin material after the substantial duplicate of the matrix is fully formed.

7. The plastic material, article, or object of claim 6 wherein the ion exchange resin coating material is a non-ionic substance from the class of sulphonic acid derivatives of polystyrene.

* * * * *